United States Patent
Hoveling

(10) Patent No.: US 8,039,097 B2
(45) Date of Patent: Oct. 18, 2011

(54) METHODS FOR PROTECTING PATINATED SURFACES OF COPPER PRODUCTS AND PATINATED COPPER PRODUCT

(75) Inventor: Stefan Hoveling, Osnabrück (DE)

(73) Assignee: KME Germany AG, Klosterstrasse (DE)

( * ) Notice: Subject to any disclaimer, the term of this patent is extended or adjusted under 35 U.S.C. 154(b) by 620 days.

(21) Appl. No.: 11/983,487

(22) Filed: Nov. 8, 2007

(65) Prior Publication Data

US 2008/0138590 A1    Jun. 12, 2008

(30) Foreign Application Priority Data

Nov. 9, 2006   (DE) .......................... 10 2006 053 192

(51) Int. Cl.
   *B32B 3/06*   (2006.01)
   *C08J 7/04*   (2006.01)

(52) U.S. Cl. ............... 428/307.3; 428/306.6; 428/319.3; 428/319.7; 427/521; 427/372.2

(58) Field of Classification Search ............... 428/319.1, 428/319.3, 319.7, 307.3, 306.6; 427/372.2, 427/512

See application file for complete search history.

(56) References Cited

U.S. PATENT DOCUMENTS

| 4,190,693 | A * | 2/1980 | Martorano et al. | 428/209 |
| 5,756,158 | A * | 5/1998 | Pilz et al. | 427/387 |
| 6,176,905 | B1 * | 1/2001 | Priggemeyer et al. | 106/1.18 |
| 2008/0171212 | A1 * | 7/2008 | Shedlosky et al. | 428/458 |

FOREIGN PATENT DOCUMENTS

WO   WO 2005123275 A1 * 12/2005

* cited by examiner

*Primary Examiner* — Hai Vo
(74) *Attorney, Agent, or Firm* — Kenyon & Kenyon LLP

(57) ABSTRACT

A method for the temporary protection of patinated surfaces of copper products, in which an aqueous polymer dispersion is applied to the patinated surface, so that the polymer dispersion penetrates regions of the porous patina that are close to the surface, and in which the aqueous polymer dispersion is subsequently dried, so that it forms a composite with the patina that is permeable to water vapor diffusion. The polymer dispersion binds loose dust located on prepatinated copper products and simplifies the handling of the copper products. It behaves in a hydrophobic manner, but on the other hand it permits the required access of air moisture and water to the patina layer for further weathering.

12 Claims, No Drawings

METHODS FOR PROTECTING PATINATED SURFACES OF COPPER PRODUCTS AND PATINATED COPPER PRODUCT

CROSS-REFERENCE TO RELATED APPLICATION

This application claims the priority benefit under 35 USC §119 of German Patent Application No. DE 10 2006 053 192.2, filed 9 Nov. 2006, which is hereby incorporated by reference.

FIELD OF THE INVENTION

The invention relates to a method for protecting patinated surfaces of copper products and a copper product having a patinated surface.

DESCRIPTION OF RELATED ART

It is known that one may patinate copper plate by specially developed mechanical/chemical/thermal methods, for roofing and front facing, as well as for roof drainage. In this method, an oxide layer is prepared from out of the copper. This is a process which is also in operation in the natural formation of patinas as a result of atmospheric effects, over long periods of time. The industrial weathering of the copper plate shortens the waiting time until an inclined surface becomes naturally green in the end phase, when exposed to free weathering. Roofs, building fronts and roof drainage thereby acquire a green patina right from the beginning, which is created only on copper. The overall weathering process is difficult to manage, because color fluctuations between individual copper plates can come about due to manufacturing techniques. The color palette reaches from a gentle green to blue-green, so that, in the last analysis, each patinated copper product is one of a kind. Because of free weathering, the patina is exposed to a steady further development, which may finally lead to the adaptation of color differences, but is also able to lead to color changes, which underlines the naturalness of the surface.

It is true, though, that problems with visual appearance of the surfaces come about in different copper products, conditional upon the treatment the material experiences before and/or during installation at the building site. In the case of patinated copper plates, it also happens that patina abrasion may occur during transport and repackaging of the copper products, and patina dust is stirred up which is able to lead to health impairment during the processing of the copper products, and to aggressive attack on the tools used. In the field of roofing and front facing as well as roof drainage, whereas uncoated copper products are frequently able to be delivered protected from damage by supporting films, this is not an option for patinated surfaces. The reason is that the loose patina dust located on the copper products prevents a sufficient adherence of the supporting films. If an adhesive were used to fix the film, depending on the type of the adhesive used and the quantity applied, an interaction with the patina might result, which can lead to undesired color changes. A coat of lacquer for protecting the patina, however, is also ruled out, since in this case the desired weathering of the copper products would be interrupted.

SUMMARY OF THE INVENTION

It is an object of the invention to provide a method for protecting patinated surfaces of copper products which prevents the creation of patina dust during, for example, the transport and repackaging of the patinated copper products, but which also ensures that the weatherability is not permanently prevented. It is a further object of the invention to provide an appropriate copper product having these properties.

In accordance with the invention, these and other objects are achieved by a method for the protection of patinated surfaces of copper products, in which an aqueous polymer dispersion is applied to the patinated surface, so that the polymer dispersion penetrates regions of the porous patina that are close to the surface, and in which the aqueous polymer dispersion is subsequently dried, the polymer dispersion forming a composite with the patina that is permeable to water vapor diffusion.

The copper product according to the invention has a patinated surface, wherein regions of the porous patina that are close to the surface are reinforced using an aqueous polymer dispersion, which forms a composite with the patina that is permeable to water vapor diffusion.

DETAILED DESCRIPTION OF THE INVENTION

In the method according to the invention for protecting surfaces of copper products, particularly of copper sheets, it is provided that one should apply an aqueous polymer dispersion onto the patinated surface. In the process, the polymer dispersion penetrates the close-to-surface regions of the porous patina, and after drying, it leads to close-to-surface cavities or pores being reinforced by an organic mass. This means that the polymer dispersion, together with the patina, forms a composite that is permeable to water diffusion.

Loose patina dust is bound by this method. At the same time, the resistance to abrasion of the patina is improved, so that no new dust forms. Such patinated copper products, treated at the factory, are able to be handled a great deal more simply during packaging and transport. Health hazards caused by patina dust are also avoided, as are corrosive attacks on tools.

But the organic coating in the form of the aqueous polymer dispersion leads in addition to simplified handling during further processing, as well as to less flaking off of the patina in response to bending or stretching the copper products. Flaking off is able to be clearly reduced especially in chamfered areas of the copper product.

The aqueous polymer dispersion is a weak water-polluting liquid of water pollution class 1. The aqueous polymer dispersion is set in its viscosity in such a way that it is completely sucked up by the porous patina layer. The patina itself thereby acquires a changed structure compared to the uncoated patina, at least in close-to-surface areas.

Within the scope of the present invention, copper products may be understood to be copper and copper alloy semifinished products on which a patina of copper salts will form, of the kind that are also created during the course of natural weathering.

It is regarded to be advantageous if the polymer dispersion is applied to the patinated surface in the form of drops. The polymer dispersion is preferably atomized finely and is applied in such a way that individual droplets are sucked up by the patina layer, without a completely closed cover layer being able to be formed as in the case of a lacquer. The quantity thus applied and especially sprayed on, at 5 g/m$^2$ to 10 g/m$^2$, is held to be so low that not all cavities or pores of the sponge-like, built-up patina are filled up with the aqueous polymer dispersion, but only the cavities close to the surface.

If one were to apply the provided quantity onto a smooth surface, that is, one which did not have open pores, then, after drying, there would come about a closed layer having a thickness of ca. 5 µm. After application and drying, the usual lacquers have comparatively large layer thicknesses of 80 µm to 150 µm. It is additionally provided that the aqueous polymer dispersion has only a very slight solid content of ca. 15% to 20%. Compared to this, lacquers frequently have a proportion of solids of up to 50%. This low solid proportion has the advantage that the polymer dispersion has a low viscosity similar to water, and therefore diffuses into the patina without problem. The high water proportion of the polymer dispersion is evaporated during drying in an environmentally friendly way, which is possible very efficiently using infrared radiation. The remaining solid component only lies on the walls of the cavities after drying, but does not completely fill them up. That is why the open pore quality of the patinated copper products is maintained.

One substantial advantage of the method, according to the present invention, is that the patina layer thus treated hardly differs visually from a natural patina surface, but can be processed and handled substantially better. The water vapor-permeable polymer coating, preferably based on acrylate, effloresces over time, depending on its installation location and stresses on the copper products, without leaving a trace, or any discoloration. A temporary protection is therefore involved. By contrast with protective films that have been used up to now during transportation, no trash is created on location.

The organic coating is hydrophobic, on the one hand, but on the other hand it permits the required access of air moisture and water to the patina layer, so that the patina surface is able to change further, in a known manner, during the course of weathering.

Surprisingly, it was determined that color matching takes place faster during the course of weathering than in the case of uncoated patinated surfaces of copper products.

It did, however, turn out that the patinated surfaces treated according to the method of the present invention have a changed wetting response. While untreated surfaces pick up moisture immediately upon being wetted with water, and discolor to become dark, the water first of all beads on the treated surfaces. Only upon longer wetting with water will the treated copper products also discolor to become dark. The protective layer applied by the polymer dispersion is transparent, but does have a slightly different type of reflection behavior than an uncoated patina surface, so that when there is a lateral incidence of light, a matte luster is detectable.

The method according to the present invention is preferably used in connection with known patinating methods. During patinating, first grinding takes place of the surface of the copper products, and subsequently coating with a patinating chemical. Then there follows transfer to a climatic chamber and weathering in conditioning storage. When a specified patina quality is attained, the method according to the present invention is now able to be carried out, which means the coating of the surface using a temporary protective layer in the form of the aqueous polymer dispersion and subsequent drying of the polymer dispersion. The finished copper products are finally able to pass a quality test and to be sent to finished goods packaging.

What is claimed is:

1. A composite material comprising an aqueous polymer dispersion, a copper product having a patinated surface and regions of a porous patina that are close to the surface, the regions of porous patina close to the surface comprising a plurality of open pores, each having a wall and being reinforced with an aqueous polymer dispersion, wherein the composite material is permeable to water vapor diffusion, wherein the polymer dispersion effloresces over time, and provides temporary protection, wherein the aqueous polymer dispersion has a proportion of solid between 15% and 20%, and wherein the solid only deposits on the walls of the open pores without completely filling up the pores.

2. The composite material according to claim 1, wherein the aqueous polymer dispersion is visually neutral compared to the patina.

3. The composite material according to claim 1, wherein a quantity of 5 $g/m^2$ to 10 $g/m^2$ of the aqueous polymer dispersion is applied to the patinated surface.

4. The composite material according to claim 1, wherein the aqueous polymer dispersion is based on acrylate.

5. The composite material according to claim 1, wherein the aqueous polymer dispersion is free of solvent.

6. A method for forming the composite material according to claim 1, comprising:
    applying the aqueous polymer dispersion to the patinated surface, so that the polymer dispersion penetrates regions of porous patina that are close to the surface, and subsequently drying the aqueous polymer dispersion.

7. The method according to claim 6, wherein a quantity of 5 $g/m^2$ to 10 $g/m^2$ of the aqueous polymer dispersion is applied to the patinated surface.

8. The method according to claim 7, wherein the aqueous polymer dispersion is applied to the patinated surface in the form of drops.

9. The method according to claim 7, wherein the water of the applied polymer dispersion is evaporated with the aid of infrared radiation.

10. The method according to claim 6, wherein the aqueous polymer dispersion is applied to the patinated surface in the form of drops.

11. The method according to claim 10, wherein the water of the applied polymer dispersion is evaporated with the aid of infrared radiation.

12. The method according to claim 6, wherein the water of the applied polymer dispersion is evaporated with the aid of infrared radiation.

* * * * *